United States Patent
Yeo et al.

(10) Patent No.: US 9,557,467 B2
(45) Date of Patent: Jan. 31, 2017

(54) DISPLAY DEVICE

(71) Applicant: LG INNOTEK CO., LTD., Seoul (KR)

(72) Inventors: In Jae Yeo, Seoul (KR); Eun Sung Seo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/063,252

(22) Filed: Mar. 7, 2016

(65) Prior Publication Data

US 2016/0187562 A1 Jun. 30, 2016

Related U.S. Application Data

(63) Continuation of application No. 14/005,514, filed as application No. PCT/KR2012/001857 on Mar. 14, 2012, now Pat. No. 9,304,247.

(30) Foreign Application Priority Data

Mar. 14, 2011 (KR) .......................... 10-2011-0022592

(51) Int. Cl.
*F21V 8/00* (2006.01)

(52) U.S. Cl.
CPC .............. *G02B 6/0023* (2013.01); *G02B 6/002* (2013.01); *G02B 6/0073* (2013.01); *G02B 6/0025* (2013.01); *G02B 6/0065* (2013.01)

(58) Field of Classification Search
CPC ..... G02B 6/002; G02B 6/0065; G02B 6/0073; G02B 6/0025; G02B 6/0023; G02B 6/0026; G02B 6/0011; G02B 6/0013; F21K 2/00; F21V 9/16; C09K 11/00; Y02B 20/16; Y02B 20/18; Y02B 20/181

See application file for complete search history.

(56) References Cited

U.S. PATENT DOCUMENTS

| | | | |
|---|---|---|---|
| 5,190,366 A | 3/1993 | World | |
| 7,513,669 B2 * | 4/2009 | Chua ...................... | B82Y 20/00 313/501 |
| 7,819,539 B2 * | 10/2010 | Kim ...................... | H01L 33/507 313/110 |
| 8,814,415 B2 * | 8/2014 | Kim ...................... | G02B 6/002 362/600 |
| 9,244,209 B2 * | 1/2016 | Lee ...................... | G02B 6/0023 |
| 9,268,080 B2 * | 2/2016 | Lee ...................... | G02B 6/0011 |

(Continued)

FOREIGN PATENT DOCUMENTS

| CN | 1758116 A | 4/2006 |
|---|---|---|
| CN | 101131506 A | 2/2008 |

(Continued)

*Primary Examiner* — Bao Q Truong
(74) *Attorney, Agent, or Firm* — Birch, Stewart, Kolasch & Birch, LLP

(57) ABSTRACT

Provided is a display device, which includes a light source, a light guide plate, a light conversion member, and a display panel. Light is incident to the light guide plate from the light source. The light conversion member is between the light source and the light guide plate. The display panel is on the light guide plate. The light guide plate includes a central region corresponding to an available display region of the display panel for displaying an image, an outer region around the central region, and a total reflection surface inclined from an optical axis of the light source, and disposed in the outer region.

18 Claims, 8 Drawing Sheets

(56) References Cited

U.S. PATENT DOCUMENTS

| | | | |
|---|---|---|---|
| 9,304,247 B2 * | 4/2016 | Yeo | G02B 6/002 |
| 2006/0072315 A1 | 4/2006 | Han et al. | |
| 2006/0103589 A1 * | 5/2006 | Chua | G02B 6/0023 |
| | | | 345/3.1 |
| 2008/0049443 A1 | 2/2008 | Lee et al. | |
| 2008/0265268 A1 | 10/2008 | Braune et al. | |
| 2008/0316767 A1 * | 12/2008 | Woo | G02B 6/002 |
| | | | 362/612 |
| 2009/0323372 A1 | 12/2009 | Kurihara et al. | |
| 2010/0051898 A1 | 3/2010 | Kim et al. | |
| 2010/0103648 A1 | 4/2010 | Kim et al. | |
| 2010/0289981 A1 | 11/2010 | Komano | |

FOREIGN PATENT DOCUMENTS

| | | |
|---|---|---|
| JP | 2001-184925 A | 7/2001 |
| JP | 2008-78089 A | 4/2008 |
| KR | 2000-0009876 A | 2/2000 |
| KR | 10-0582456 A | 5/2006 |
| KR | 10-2008-0040788 A | 5/2008 |
| KR | 10-2009-0021912 A | 3/2009 |
| KR | 10-2010-0027892 A | 3/2010 |
| KR | 10-2010-0029519 A | 3/2010 |
| KR | 10-2011-0034207 A | 4/2011 |
| WO | WO 2008/065906 A1 | 6/2008 |

* cited by examiner

DISPLAY DEVICE

CROSS REFERENCE TO RELATED APPLICATION

This application is a Continuation of co-pending U.S. application Ser. No. 14/005,514 filed on Nov. 22, 2013, which is the national phase of PCT International Application No. PCT/KR2012/001857 filed on Mar. 14, 2012, and which claims priority to Application No. 10-2011-0022592 filed in the Republic of Korea on Mar. 14, 2011. The entire contents of all of the above applications are hereby incorporated by reference.

TECHNICAL FIELD

Embodiments relate to a display device.

BACKGROUND ART

Light emitting diodes (LEDs) are semiconductor devices that use characteristics of compound semiconductors to convert electricity into ultraviolet rays, visible light, or infrared rays, which are widely used in home appliances, remote controls, and large scale electronic displays.

Especially, high luminance LED light sources are used in lighting devices, and have high energy efficiency and long service life to decrease replacement costs. Furthermore, such high luminance LED light sources are resistant to vibration or shock, and do not require poisonous substances such as mercury, and thus, replace typical incandescent lamps or fluorescent lamps in terms of energy conservation, protection of the environment, and cost saving.

In addition, LEDs are appropriate as light sources for medium to large liquid crystal display (LCD) TVs and monitors. Particularly, since LEDs are superior in color purity, power consumption, and miniaturization to cold cathode fluorescent lamps (CCFLs) that are widely used in LCDs, various products include LEDs, and active research is being carried out on LEDs.

Moreover, various technologies of using blue LEDs and quantum dots (QDs) as a phosphor for emitting red light and green light to emit white light are being introduced. White light emitted using such quantum dots has high brightness and excellent color reproductivity.

However, research is needed to decrease optical loss and color unevenness of LEDs used in a backlight unit.

DISCLOSURE

Technical Problem

Embodiments provide a display device having improved brightness.

Technical Solution

In one embodiment, a display device includes: a light source; a light guide plate to which light is incident from the light source; a light conversion member between the light source and the light guide plate; and a display panel on the light guide plate, wherein the light guide plate includes: a central region corresponding to an available display region of the display panel for displaying an image; an outer region around the central region; and a total reflection surface inclined from an optical axis of the light source, and disposed in the outer region.

In another embodiment, a display device includes: a light guide plate; a light source at a light incident surface of the light guide plate; a light conversion member between the light guide plate and the light source; and a display panel on the light guide plate, wherein the light guide plate includes a total reflection surface totally reflecting light that is emitted from the light source through the light conversion member, and that has an angle ranging from about 40° to about 80° from an optical axis of the light source.

In another embodiment, a display device includes: a light guide plate; a light source at a first side surface of the light guide plate; a light conversion member between the light source and the light guide plate; and a display panel on the light guide plate, wherein the light guide plate includes: a second side surface crossing the first side surface; and a total reflection surface extending from the first side surface to the second side surface, and inclined from the first side surface.

The details of one or more embodiments are set forth in the accompanying drawings and the description below. Other features will be apparent from the description and drawings, and from the claims.

Advantageous Effects

A display device according to an embodiment includes a light guide plate having a total reflection surface in an outer region. The total reflection surface can totally reflect light emitted from a light source. Particularly, the total reflection surface can totally reflect light emitted from a light source can totally reflect light, emitted at a large angle from an optical axis of the light source to the outer region, into the light guide plate.

Thus, the total reflection surface can prevent light from being emitted to the outside through the outer region of the light guide plate. Particularly, the total reflection surface can totally reflect light having an angle ranging from 50° to 80° from the optical axis of the light source, and improve optical efficiency of the light guide plate.

Thus, the display device according to the embodiment can have improved brightness.

MODE FOR INVENTION

In the description of embodiments, it will be understood that when a substrate, frame, sheet, layer, or pattern is referred to as being 'on' or 'under' another substrate, frame, sheet, layer, or pattern, the terminology of 'on' and 'under' includes both the meanings of 'directly' and 'indirectly'. Further, the reference about 'on' and 'under' each component will be made on the basis of drawings. In addition, the sizes of elements and the relative sizes between elements may be exaggerated for further understanding of the present disclosure.

Figure 1:
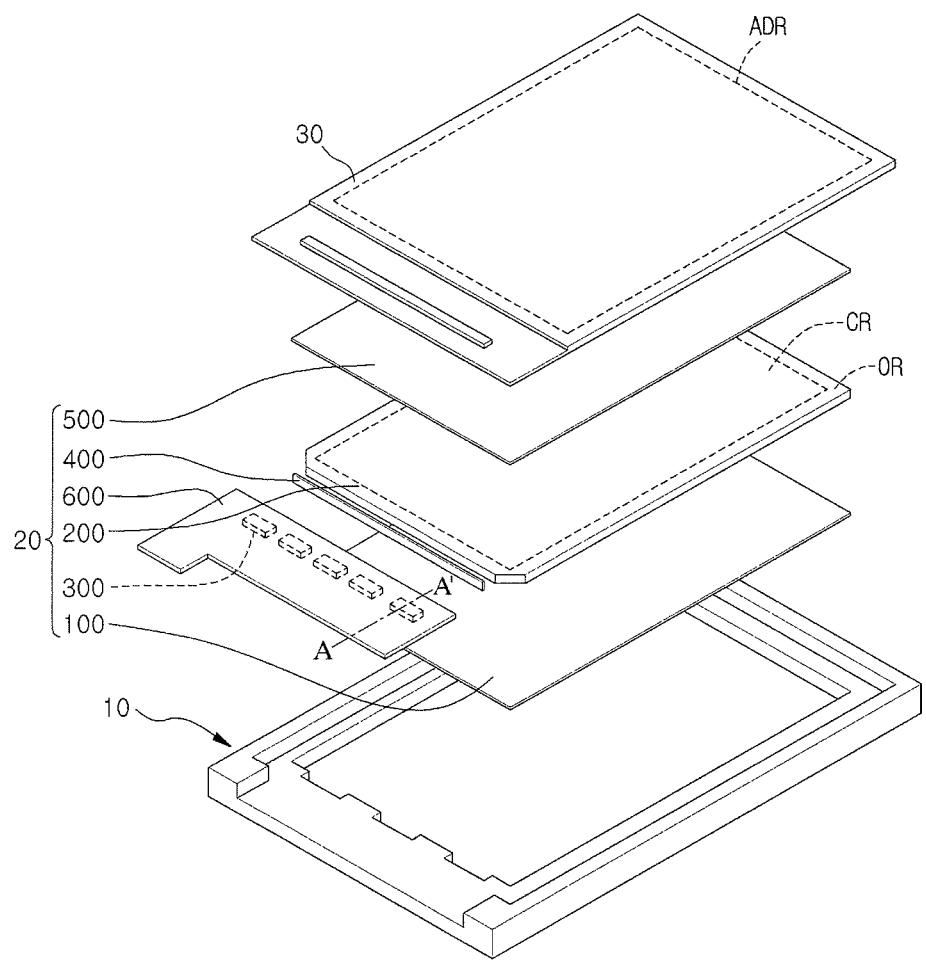
FIG. 1 is an exploded perspective view illustrating a liquid crystal display device according to a first embodiment.
Figure 2:
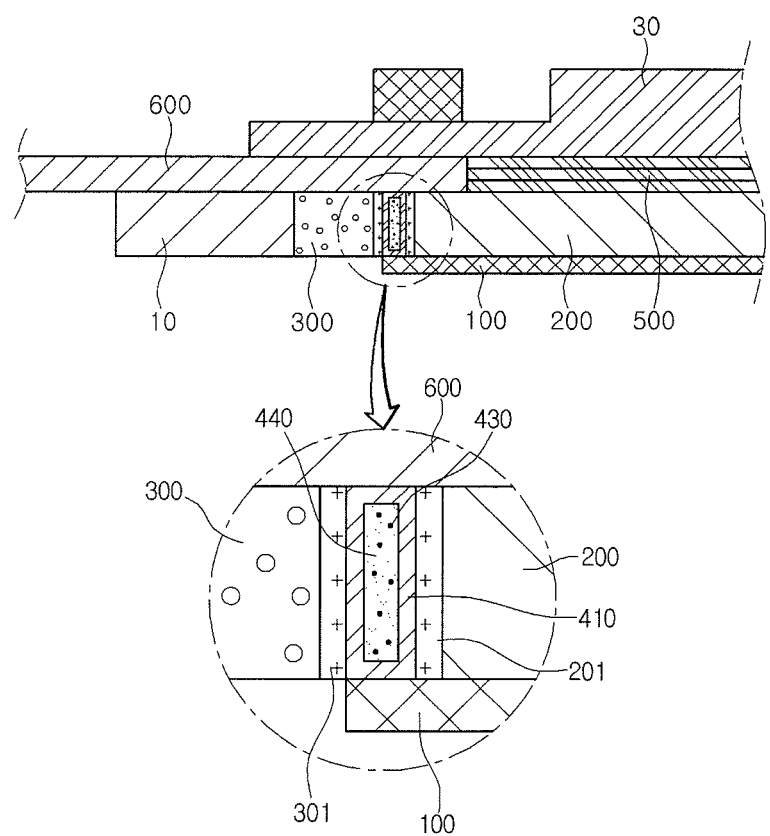
FIG. 2 is a cross-sectional view taken along line A-A' of FIG. 1.
Figure 3:
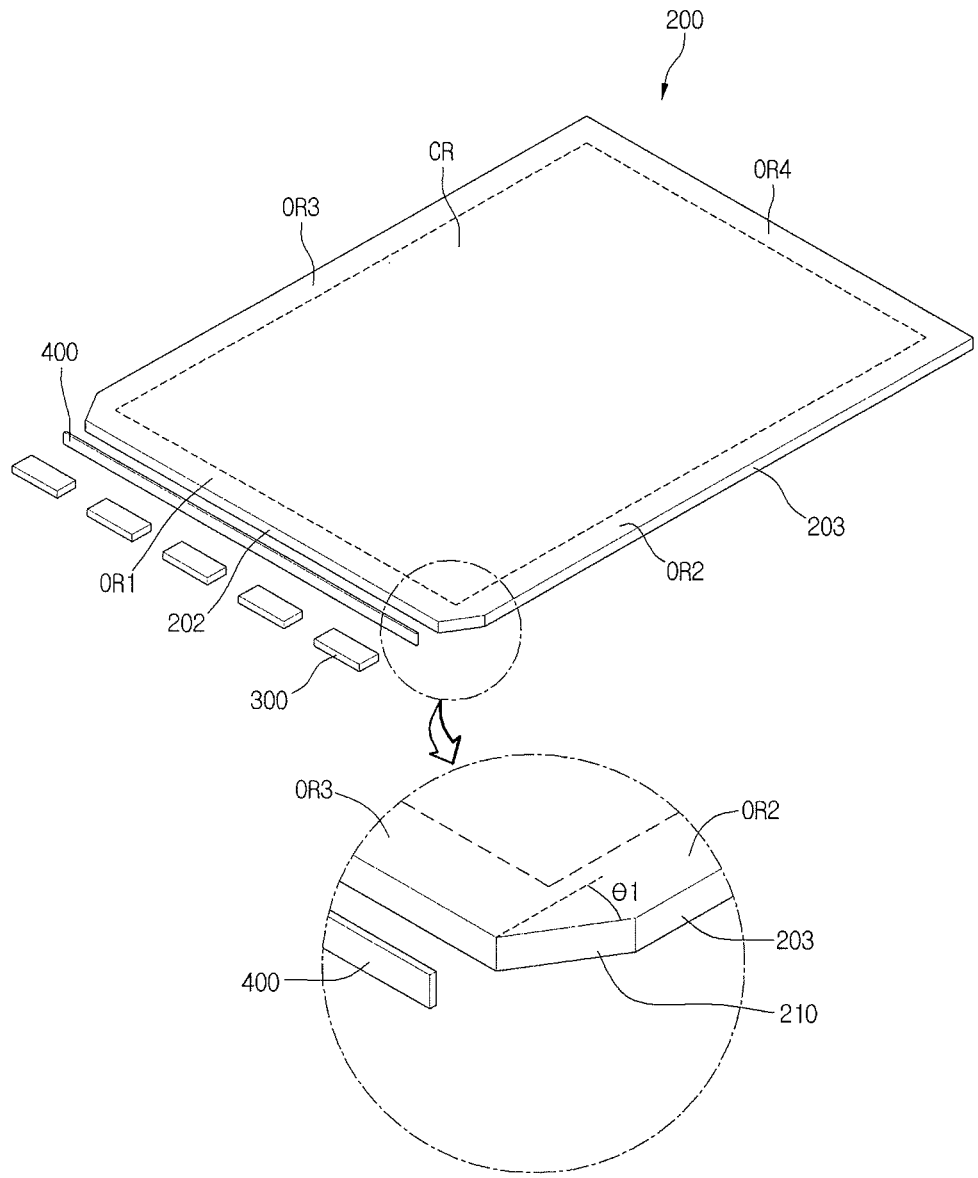
FIG. 3 is a perspective view illustrating light emitting diodes, a light conversion member, and a light guide plate according to an embodiment.
Figure 4:
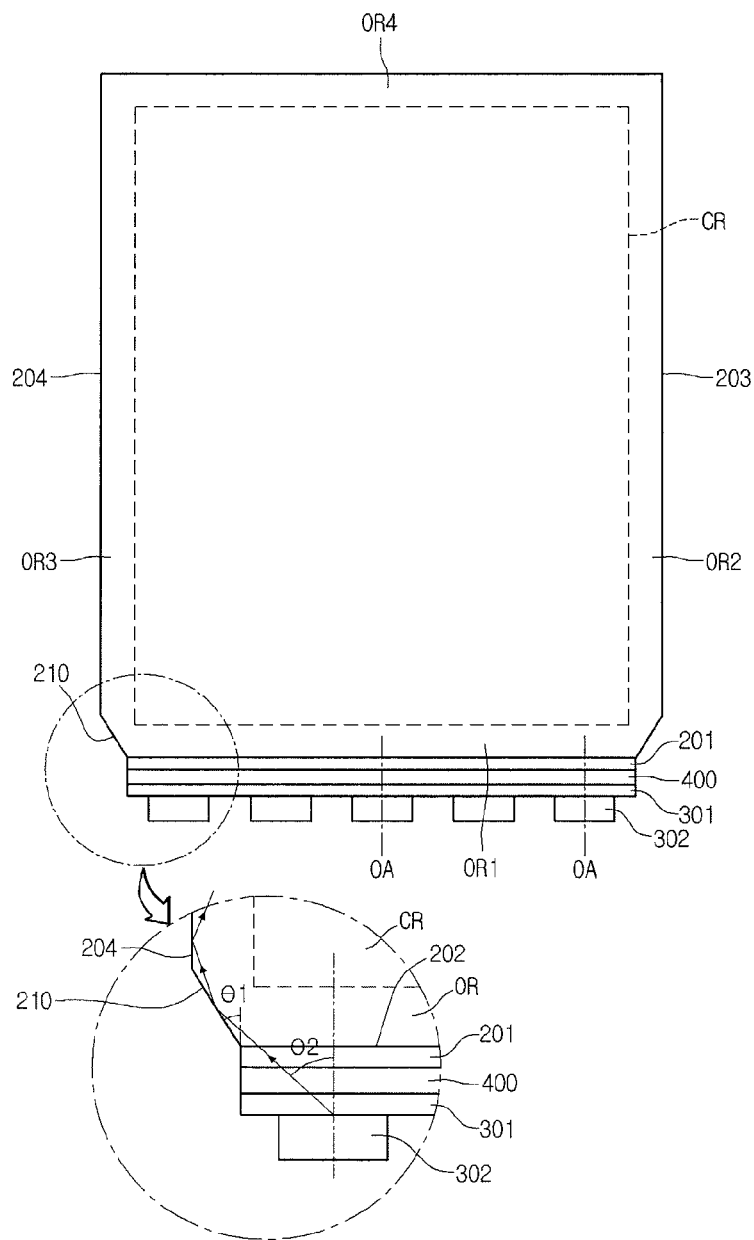
FIG. 4 is a plan view illustrating a path of light emitted from light emitting diodes according to an embodiment.
Figure 5:
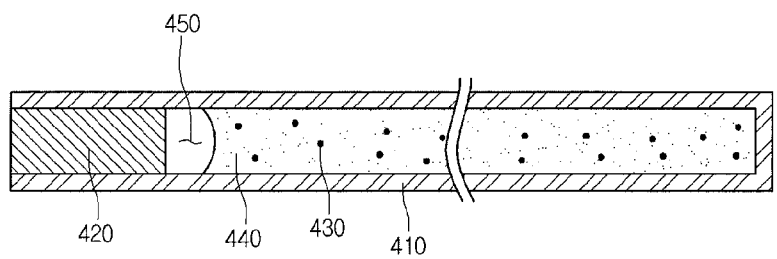
FIG. 5 is a cross-sectional view illustrating a light conversion member according to an embodiment.

FIG. 1 is an exploded perspective view illustrating a liquid crystal display device according to a first embodiment. FIG. 2 is a cross-sectional view taken along line A-A' of FIG. 1. FIG. 3 is a perspective view illustrating light emitting diodes, a light conversion member, and a light guide plate according to the current embodiment. FIG. 4 is a plan view illustrating a path of light emitted from light emitting diodes according to the current embodiment. FIG. 5 is a cross-sectional view illustrating a light conversion member according to the current embodiment.

Referring to FIGS. 1 to 5, a liquid crystal display device according to the current embodiment includes a mold frame 10, a backlight assembly 20, and a liquid crystal panel 30.

The mold frame 10 accommodates the backlight assembly 20 and the liquid crystal panel 30. The mold frame 10 has a tetragonal frame shape, and may be formed of plastic or reinforced plastic.

A chassis may be disposed under the mold frame 10 to surround the mold frame 10 and support the backlight assembly 20. The chassis may be disposed on a side surface of the mold frame 10.

The backlight assembly 20 is disposed inside the mold frame 10, and generates light to emit the light to the liquid crystal panel 30. The backlight assembly 20 includes a reflective sheet 100, a light guide plate 200, a plurality of light emitting diodes 300, a light conversion member 400, a plurality of optical sheets 500, and a flexible printed circuit board (FPCB) 600.

The reflective sheet 100 upwardly reflects light generated from the light emitting diodes 300.

The light guide plate 200 is disposed on the reflective sheet 100, and receives light emitted from the light emitting diodes 300 and emits the light upward through reflection, refraction, and scattering.

The light guide plate 200 includes a light incident surface 202 facing the light emitting diodes 300. That is, the light guide plate 200 has a side surface facing the light emitting diodes 300, which functions as the light incident surface 202.

The light guide plate 200 includes a first side surface 203 and a second side surface 204, which extend in a direction crossing the light incident surface 202. Thus, when being viewed from a top view, the light guide plate 200 may have a tetragonal plate shape as a whole. The light incident surface 202 is one of the side surfaces of the light guide plate 200, that is, a third side surface.

Referring to FIGS. 1, 3, and 4, the light guide plate 200 includes a central region CR and an outer region OR. That is, the central region CR and the outer region OR are defined in the light guide plate 200.

The central region CR is disposed in the central portion of the light guide plate 200. The central region CR corresponds to an available display region ADR of the light guide plate 30. The available display region ADR is a region in which an image is substantially displayed on the liquid crystal panel 30. When being viewed from a top view, the central region CR may have a rectangular shape.

The outer region OR is disposed at the periphery of the central region CR. The outer region OR may correspond to a boundary of the light guide plate 200. When being viewed from a top view, the outer region OR may have a closed loop shape.

The outer region OR includes a first outer region OR1, a second outer region OR2, a third outer region OR3, and a fourth outer region OR4.

The first outer region OR1 corresponds to the light incident surface 202. That is, the first outer region OR1 may extend in an extension direction of the light incident surface 202. That is, the first outer region OR1 is adjacent to the light emitting diodes 300. That is, the first outer region OR1 extends in an extension direction of the light conversion member 400. The first outer region OR1 is disposed between the light conversion member 400 and the central region CR.

An extension direction of the second outer region OR2 crosses an extension direction of the first outer region OR1. That is, the extension direction of the second outer region OR2 crosses the extension direction of the light conversion member 400. An end of the first outer region OR1 may connect to an end of the second outer region OR2.

An extension direction of the third outer region OR3 crosses an extension direction of the first outer region OR1. That is, the extension direction of the third outer region OR3 crosses the extension direction of the light conversion member 400. The other end of the first outer region OR1 may connect to an end of the third outers region OR3.

The third outer region OR3 is parallel to the second outer region OR2. The third outer region OR3 may face the second outer region OR2 with the central region CR therebetween.

The fourth outer region OR4 extends in the extension direction of the first outer region OR1. That is, the fourth outer region OR4 may face the first outer region OR1 with the central region CR therebetween.

The light guide plate 200 includes total reflection surfaces 210. The total reflection surfaces 210 are disposed in the outer region OR of the light guide plate 200. Particularly, the total reflection surfaces 210 may be disposed in the second outer region OR2 and the third outer region OR3, respectively.

More particularly, the total reflection surfaces 210 may be disposed in a portion where the first outer region OR1 crosses the second outer region OR2, and a portion where the first outer region OR1 crosses the third outer region OR3, respectively. That is, the total reflection surfaces 210 are disposed at corners of the light guide plate 200, respectively. Thus, the light guide plate 200 may have a tetragonal plate shape with cut corners.

The total reflection surfaces 210 may be symmetrical to each other. The total reflection surfaces 210 are inclined from an optical axis OA of the light emitting diodes 300. Particularly, the total reflection surfaces 210 may be inclined at an angle θ1 ranging from about 3° to about 30° from the optical axis OA of the light emitting diodes 300. More particularly, the total reflection surfaces 210 may be inclined at an angle ranging from about 10° to about 20° from the optical axis OA of the light emitting diodes 300. That is, the total reflection surfaces 210 may be inclined at an angle ranging from about 70° to about 80° from the light incident surface 202.

The total reflection surfaces 210 are inclined from the first and second side surfaces 203 and 204 of the light guide plate 200, respectively.

The total reflection surfaces 210 extend from the first and second side surfaces 203 and 204, respectively. That is, one of the total reflection surfaces 210 extends from the first side surface 203 to the light incident surface 202, and the other extends from the second side surface 204 to the light incident surface 202.

The total reflection surfaces 210 totally reflect light emitted from the light emitting diodes 300, into the light guide plate 200. More particularly, the total reflection surfaces 210 may totally reflect light emitted from outermost ones 302 of the light emitting diodes 300.

Referring to FIG. 4, the total reflection surfaces 210 may totally reflect light emitted from the outermost light emitting diodes 302 and having an angle θ2 from the optical axis OA. For example, the total reflection surfaces 210 may totally reflect light emitted from the outermost light emitting diodes 302 and having an angle of about 40° or greater from the optical axis OA. Particularly, the total reflection surfaces 210 may totally reflect light emitted from the outermost light emitting diodes 302 and having an angle ranging from about 50° to about 80° from the optical axis OA. More particularly, the total reflection surfaces 210 may totally reflect light emitted from the outermost light emitting diodes 302 and having an angle ranging from about 60° to about 70° from the optical axis OA.

Further, at least one portion of the light totally reflected by the total reflection surfaces 210 as described above may be totally reflected by the first side surface 203 or the second side surface 204. That is, light emitted from the light conversion member 400, which would otherwise be emitted out of the light guide plate 200, be guided to the inside of the light guide plate 200 by the total reflection surfaces 210. As such, the total reflection surfaces 210 change paths of light emitted from the light conversion member 400, so that the first and second side surfaces 203 and 204 can totally reflect a larger amount of light.

Accordingly, the total reflection surfaces 210 can decrease a loss of light emitted laterally from the first and second side surfaces 203 and 204.

The light emitting diodes 300 are disposed at the light incident surface 202. The light emitting diodes 300 function as light sources for emitting light. More particularly, the light emitting diodes 300 emit light to the light conversion member 400.

The number of the light emitting diodes 300 illustrated in the drawings is five, but is not limited thereto. For example, the number of the light emitting diodes 300 may be nine.

The light emitting diodes 300 may be blue light emitting diodes for generating blue light, or ultraviolet (UV) light emitting diodes for generating UV rays. That is, the light emitting diodes 300 may generate blue light having a wavelength ranging from about 430 nm to about 470 nm, or ultraviolet rays having a wavelength ranging from about 300 nm to about 400 nm.

The light emitting diodes 300 are mounted on the flexible printed circuit board 600. The light emitting diodes 300 are disposed under the flexible printed circuit board 600. The light emitting diodes 300 are driven by a driving signal applied through the flexible printed circuit board 600.

The light conversion member 400 is disposed between the light guide plate 200 and the light emitting diodes 300. The light conversion member 400 is adhered to a side surface of the light guide plate 200. More particularly, the light conversion member 400 is adhered to the light incident surface 202 of the light guide plate 200. Furthermore, the light conversion member 400 may be adhered to the light emitting diodes 300.

The light conversion member 400 changes a wavelength of light incident from the light emitting diodes 300. For example, the light conversion member 400 may convert blue light incident from the light emitting diodes 300 into green light and red light. That is, the light conversion member 400 may convert a portion of the blue light into green light having a wavelength ranging from about 520 nm to about 560 nm, and the rest of the blue light into red light having a wavelength ranging from about 630 nm to about 660 nm.

In addition, the light conversion member 400 may convert UV rays incident from the light emitting diodes 300 into blue, green, and red light. That is, the light conversion member 400 may convert: a portion of the UV rays into blue light having a wavelength ranging from about 430 nm to about 470 nm; another portion of the UV rays into green light having a wavelength ranging from about 520 nm to about 560 nm; and the rest of the UV rays into red light having a wavelength ranging from about 630 nm to about 660 nm.

Accordingly, light emitted from the light conversion member 400 may be whit light. That is, white light as a combination of blue, green, and red light may be incident to the light guide plate 200.

Referring to FIG. 5, the light conversion member 400 includes a tube 410, a sealing member 420, a plurality of light conversion particles 430, and a matrix 440.

The tube 410 accommodates the sealing member 420, the light conversion particles 430, and the matrix 440. That is, the tube 410 functions as a container for accommodating the sealing member 420, the light conversion particles 430, and the matrix 440. The tube 410 has a shape elongated in one direction.

The tube 410 may have a tetragonal tube shape. That is, the tube 410 may have a rectangular cross-section perpendicular to the longitudinal direction of the tube 410. The tube 410 may have a width of about 0.6 mm, and a height of about 0.2 mm. That is, the tube 410 may be a capillary tube.

The sealing member 420 is disposed within the tube 410. Furthermore, the sealing member 420 is disposed at an end of the tube 410. The sealing member 420 seals the inside of the tube 410. The sealing member 420 may include an epoxy resin.

The light conversion particles 430 are disposed within the tube 410. More particularly, the light conversion particles 430 are uniformly dispersed within the matrix 440, and the matrix 440 is disposed within the tube 410.

The light conversion particles 430 changes a wavelength of light emitted from the light emitting diodes 300. That is, the light conversion particles 430 receive light emitted from the light emitting diodes 300 to change the wavelength of the light. For example, the light conversion particles 430 may convert blue light emitted from the light emitting diodes 300 into green light and red light. That is, a part of the light conversion particles 430 may convert the blue light into green light having a wavelength ranging from about 520 nm to about 560 nm, and the rest of the light conversion particles 430 may convert the blue light into red light having a wavelength ranging from about 630 nm to about 660 nm.

Alternatively, the light conversion particles 430 may convert UV rays emitted from the light emitting diodes 300 into blue, green, and red light. That is, a part of the light conversion particles 430 may convert the UV rays into blue light having a wavelength ranging from about 430 nm to about 470 nm, and another part of the light conversion particles 430 may convert the UV rays into green light having a wavelength ranging from about 520 nm to about 560 nm. In addition, the rest of the light conversion particles 430 may convert the UV rays into red light having a wavelength ranging from about 630 nm to about 660 nm.

That is, when the light emitting diodes 300 may be blue light emitting diodes for emitting blue light, light conversion particles for converting blue light into green and red light may be used as the light conversion particles 430. Alternatively, when the light emitting diodes 300 may be UV light emitting diodes for emitting UV rays, light conversion particles for converting UV rays into blue, green, and red light may be used as the light conversion particles 430.

The light conversion particles 430 may be quantum dots (QDs). The quantum dot may include a core nonocrystal and a shell nanocrystal surrounding the core nonocrystal. Further, the quantum dot may include an organic ligand attached to the shell nanocrystal. Further, the quantum dot may include an organic coating layer surrounding the shell nanocrystal.

The shell nanocrystal may include two or more layers. The shell nanocrystal is disposed on an outer surface of the core nanocrystal. A wavelength of light incident to the core nonocrystal is increased by the shell nanocrystal constituting a shell layer of the quantum dot, and efficiency of the light is increased.

The quantum dot may include at least one of a group II compound semiconductor, a group III compound semiconductor, a group V compound semiconductor, and a group VI compound semiconductor. More particularly, the core nanocrystal may include CdSe, InGaP, CdTe, CdS, ZnSe, ZnTe, ZnS, HgTe, or HgS. The shell nanocrystal may include CuZnS, CdSe, CdTe, CdS, ZnSe, ZnTe, ZnS, HgTe, or HgS. The quantum dot may have a diameter ranging from about 1 nm to about 10 nm.

A wavelength of light emitted from the quantum dot may depend on the size of the quantum dot or a molar ratio of a molecular cluster compound to a precursor during a synthesis process. The organic ligand may include pyridine, mercapto alcohol, thiol, phosphine, and phosphine oxide. The organic ligand stables an unstable quantum dot after synthesis. Otherwise, a dangling bond formed at the periphery of a quantum dot after synthesis may make the quantum dot unstable. However, an unbound end of the organic ligand is bound to the dangling bond to thereby stabilize the quantum dot.

When the size of the quantum dot is smaller than the Exciton Bohr radius determined by an electron and hole excited by electricity or light, quantum confinement occurs to split original energy levels into smaller ones, and change the size of energy gaps. In addition, charge localization within the quantum dot improves light emitting efficiency thereof.

The fluorescent wavelength of the quantum dot is determined by the size thereof, unlike a typical fluorescent dye. That is, as the size of the quantum dot is decreased, a wavelength of light emitted therefrom is decreased. Thus, visible light having a desired wavelength may be emitted by controlling the size of the quantum dot. In addition, the quantum dot is greater in extinction coefficient than a typical dye by about 100 to 1000 times, and has excellent quantum yield, thereby improving fluorescent efficiency.

The quantum dots may be synthesized using a chemical wet method. The chemical wet method is a method of adding a precursor material to an organic solvent for growing particles. Accordingly, the quantum dots may be synthesized.

The matrix 440 encloses the light conversion particles 430. That is, the light conversion particles 430 are uniformly dispersed within the matrix 440. The matrix 440 may include a polymer. The matrix 440 is transparent. That is, the matrix 440 may be formed of a transparent polymer.

The matrix 440 is disposed within the tube 410. That is, the tube 410 is substantially filled with the matrix 440. The matrix 440 may tightly contact the inner surface of the tube 410.

An air layer 450 is disposed between the sealing member 420 and the matrix 440. The air layer 450 is filled with nitrogen. The air layer 450 functions as a buffer between the sealing member 420 and the matrix 440.

The light conversion member 400 may be formed using the following method.

First, the light conversion particles 430 are uniformly dispersed into a resin composition. The resin composition is transparent, and may be photo-curable.

After that, the inside of the tube 410 is depressurized. Then, an inlet of the tube 410 is immersed into the resin composition with the light conversion particles 430 dispersed, and the ambient pressure is increased. Accordingly, the resin composition provided with the light conversion particles 430 is introduced into the tube 410.

Thereafter, a portion of the resin composition introduced in the tube 410 is removed from the inlet of the tube 410.

Then, the resin composition within the tube 410 is cured by, e.g., UV rays, to thereby form the matrix 440.

Thereafter, an epoxy-based resin composition is introduced into the inlet of the tube 410. Then, the epoxy-based resin composition is cured to form the sealing member 420. To this end, nitrogen atmosphere is formed. Accordingly, an air layer including nitrogen may be formed between the sealing member 420 and the matrix 440.

A first adhesive member 201 is disposed between the light guide plate 200 and the light conversion member 400. The light conversion member 400 is adhered to the light incident surface 202 of the light guide plate 200 by the first adhesive member 201. At this point, the first adhesive member 201 tightly contacts the light conversion member 400 and the light incident surface 202 of the light guide plate 200.

The first adhesive member 201 may be removed. Accordingly, an air layer may be formed between the light guide plate 200 and the light emitting diodes 300.

A second adhesive member 301 is disposed between the light conversion member 400 and the light emitting diodes 300. The light emitting diodes 300 are adhered to the light conversion member 400 by the second adhesive member 301. At this point, the second adhesive member 301 tightly contacts the light conversion member 400 and light emitting surfaces 341 of the light emitting diodes 300.

The first and second adhesive members 201 and 301 prevent an air layer from being formed between the light emitting diodes 300 and the light guide plate 200. Accordingly, refractivity variations between media between the light guide plate 200 and the light emitting diodes 300 can be decreased.

Thus, a portion of light emitted from the light emitting diodes 300 may be emitted with a wide emission angle to the light guide plate 200. That is, since light emitted from the light emitting diodes 300 does not pass through an air layer, when the light is incident to the light guide plate 200, a wide emission angle thereof can be maintained.

Another portion of the light emitted from the light emitting diodes 300 is converted into light of different wavelength by the light conversion member 400. As such, when the light conversion particles 430 change a wavelength of light, the wavelength-changed light may be emitted in random directions from the light conversion particles 430. That is, the light conversion particles 430 may emit converted light in various directions, regardless of the directions of incident light.

Thus, light of wavelength changed by the light conversion member 400 may be emitted with a wider emission angle to the light guide plate 200.

Moreover, the light conversion particles 430 may emit wavelength-changed light in random directions. That is, the light conversion particles 430 may emit converted light in all directions, regardless of the directions of light emitted from the light emitting diodes 300.

As a result, a large portion of light emitted from the light emitting diodes 300 may be emitted to the light guide plate 200 at a large angle from the optical axis OA of the light emitting diodes 300. Also, light converted by the light conversion member 400 may be emitted to the light guide plate 200 at a large angle from the optical axis OA of the light emitting diodes 300.

Accordingly, a great amount of the light emitted from the light emitting diodes 300 may be emitted out of the light guide plate 200 along a side surface of the light guide plate 200 without total reflection within the light guide plate 200.

At this point, the total reflection surfaces 210 inclined at a certain angle from the optical axis OA and disposed in the outer region OR totally reflect light emitted from the light emitting diodes 300, into the light guide plate 200.

The optical sheets 500 are disposed on the light guide plate 200. The optical sheets 500 improve characteristics of light passing therethrough.

The flexible printed circuit board 600 is electrically connected to the light emitting diodes 300. The light emitting diodes 300 may be mounted on the flexible printed circuit board 600. The flexible printed circuit board 600 is disposed inside the mold frame 10. The flexible printed circuit board 600 is disposed on the light guide plate 200.

The mold frame 10 and the backlight assembly 20 constitute a backlight unit. That is, the backlight unit includes the mold frame 10 and the backlight assembly 20.

The liquid crystal panel 30 is disposed accommodated in the mold frame 10, and is disposed on the optical sheets 500.

The liquid crystal panel 30 controls the intensity of light passing therethrough to display an image. That is, the liquid crystal panel 30 is a display panel for displaying an image. The liquid crystal panel 30 includes a TFT substrate, a color filter substrate, a liquid crystal layer disposed between the TFT substrate and the color filter substrate, and a plurality of polarization filters.

As described above, the total reflection surfaces 210 totally reflect light emitted from the light emitting diodes 300, into the light guide plate 200. Accordingly, the liquid crystal display device of the current embodiment decreases a loss of light emitted from a side surface of the light guide plate 200, and improves brightness and brightness uniformity thereof.

That is, since there is no air layer between the light guide plate 200 and the light emitting diodes 300, an emission angle of light incident to the light guide plate 200 can be increased. In addition, the light conversion particles 430 increase the emission angle. The liquid crystal display device of the current embodiment combines the light conversion member 400 and the total reflection surfaces 210 to compensate for an optical loss due to the increase of the emission angle.

Figure 6:
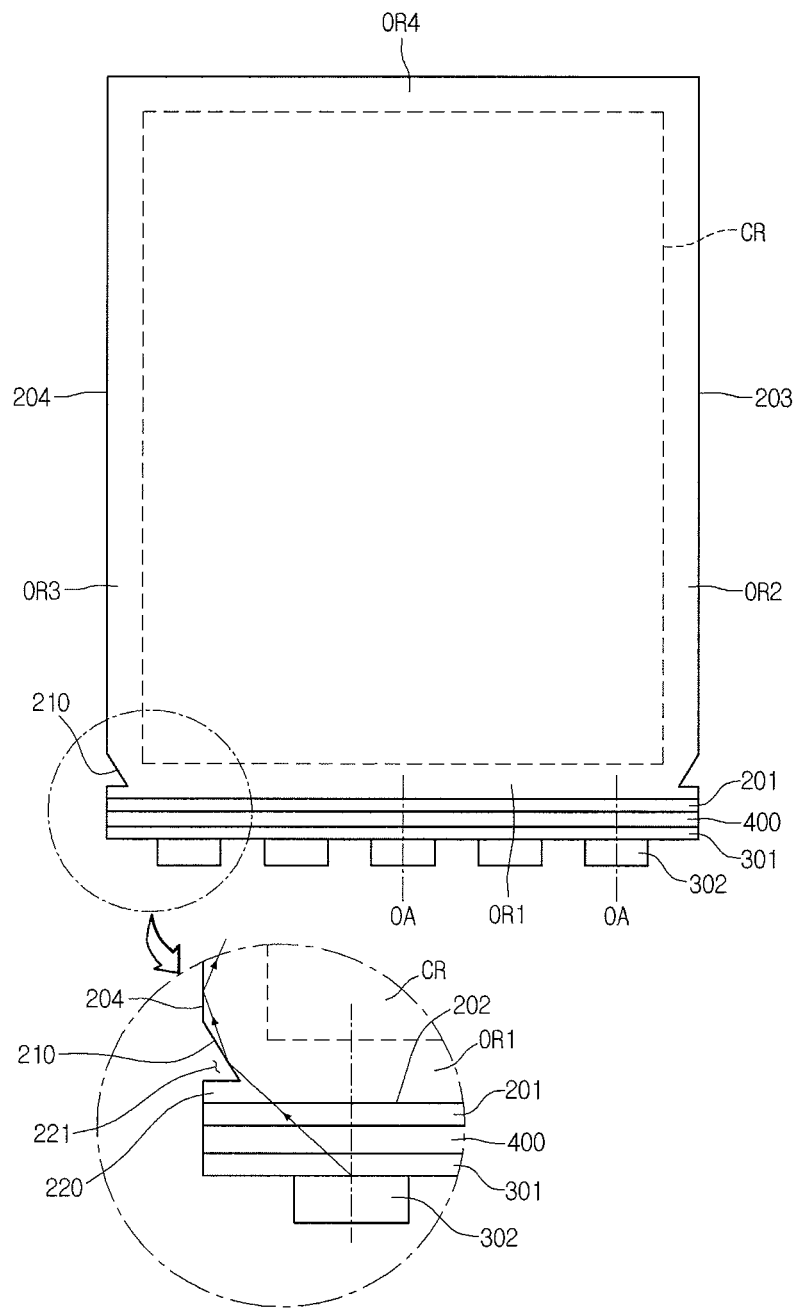
FIG. 6 is a plan view illustrating light emitting diodes, a light conversion member, and a light guide plate according to a second embodiment.

FIG. 6 is a plan view illustrating light emitting diodes, a light conversion member, and a light guide plate according to a second embodiment. The current embodiment refers to the previous embodiment with respect to a liquid crystal display device, and support parts is additionally described. That is, the description of the previous embodiment may be substantially coupled to a description of the current embodiment except for changed parts.

Referring to FIG. 6, a light guide plate 200 includes support parts 220.

The support parts 220 extend from ends of total reflection surfaces 210, respectively. An extension direction of the support parts 220 is the same as that of a light conversion member 400. The support parts 220 may be disposed at corners of the light guide plate 200, respectively.

Ends of the support parts 220 may be flush with first and second side surfaces 203 and 204 of the light guide plate 200, respectively. The support parts 220 may have a length ranging from about 4 mm to about 6 mm.

That is, the light guide plate 200 may have recesses 221 in the first and second side surfaces 203 and 204. The total reflection surfaces 210 may define a side of the recesses 221.

The support parts 220 may support the light conversion member 400. The support parts 220 facilitates coupling of the light guide plate 200 to, e.g., a mold frame. Accordingly, the liquid crystal display device according to the current embodiment can have improved strength.

Figure 7:
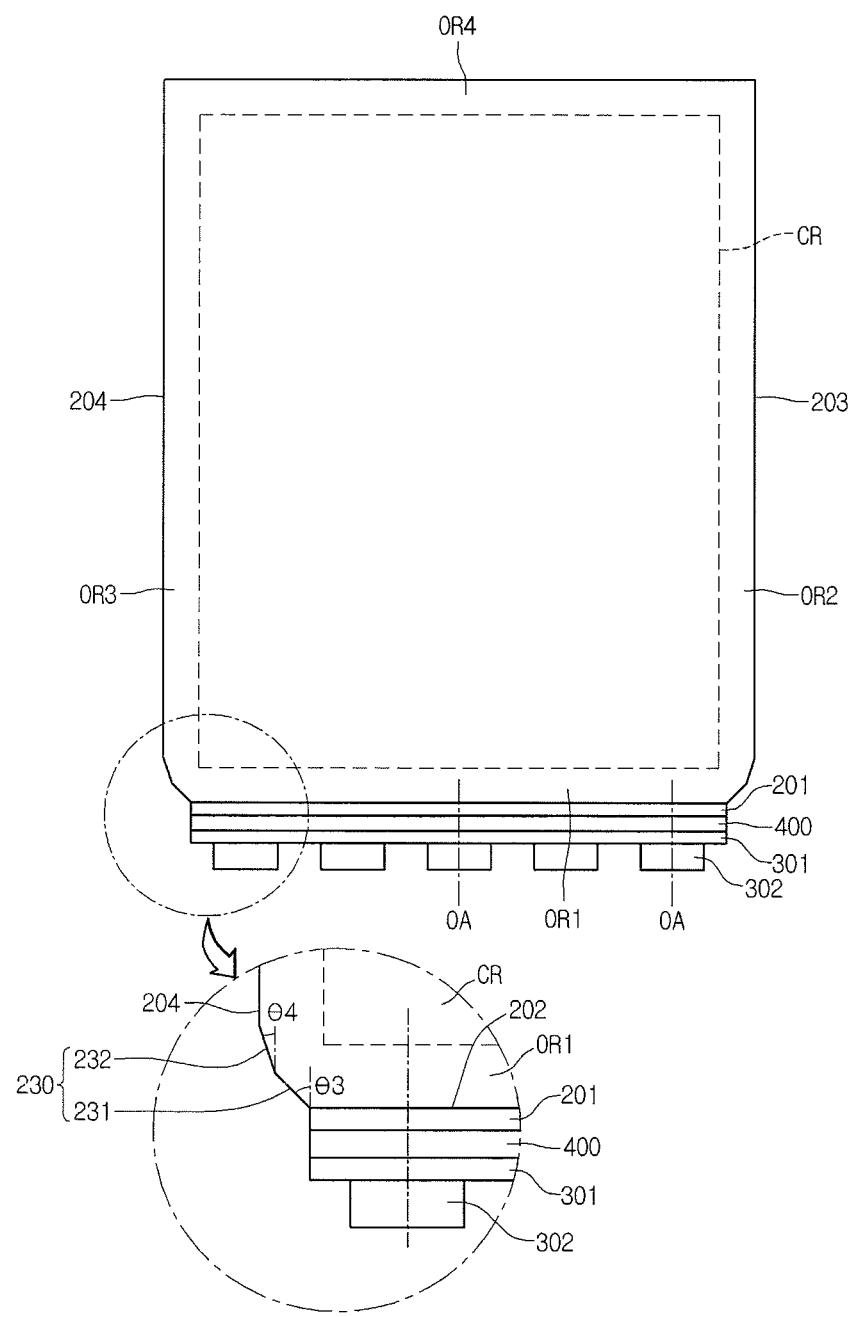
FIG. 7 is a plan view illustrating light emitting diodes, a light conversion member, and a light guide plate according to a third embodiment.

FIG. 7 is a plan view illustrating light emitting diodes, a light conversion member, and a light guide plate according to a third embodiment. The current embodiment refers to the previous embodiments with respect to a liquid crystal display device, and inclined surfaces are additionally described. That is, the description of the previous embodiments may be substantially coupled to a description of the current embodiment except for changed parts.

Referring to FIG. 7, each of total reflection surfaces 230 includes a first inclined surface 231 and a second inclined surface 232.

The first inclined surface 231 extends to the second inclined surface 232 from a light incident surface 202 of a light guide plate 200. The second inclined surface 232 extends from the first inclined surface 231 to a first or second side surface 203 or 204 of the light guide plate 200.

The first inclined surface 231 may be inclined at a first angle θ3 from an optical axis OA of light emitting diodes 300. The second inclined surface 232 may be inclined at a second angle θ4, which is smaller than the first angle θ3, from the optical axis OA.

Accordingly, the total reflection surfaces 230 can totally reflect light emitted from the light emitting diodes 300, more widely.

That is, light emitted from outermost light emitting diodes 302 and having a great angle from the optical axis OA may be totally reflected by the first inclined surfaces 231, and light emitted from the outermost light emitting diodes 302 and having a small angle from the optical axis OA may be totally reflected by the second inclined surfaces 232.

Accordingly, the total reflection surfaces 210 can efficiently and totally reflect the light emitted from the outermost light emitting diodes 302.

Thus, the liquid crystal display device according to the current embodiment can have improved brightness.

Figure 8:
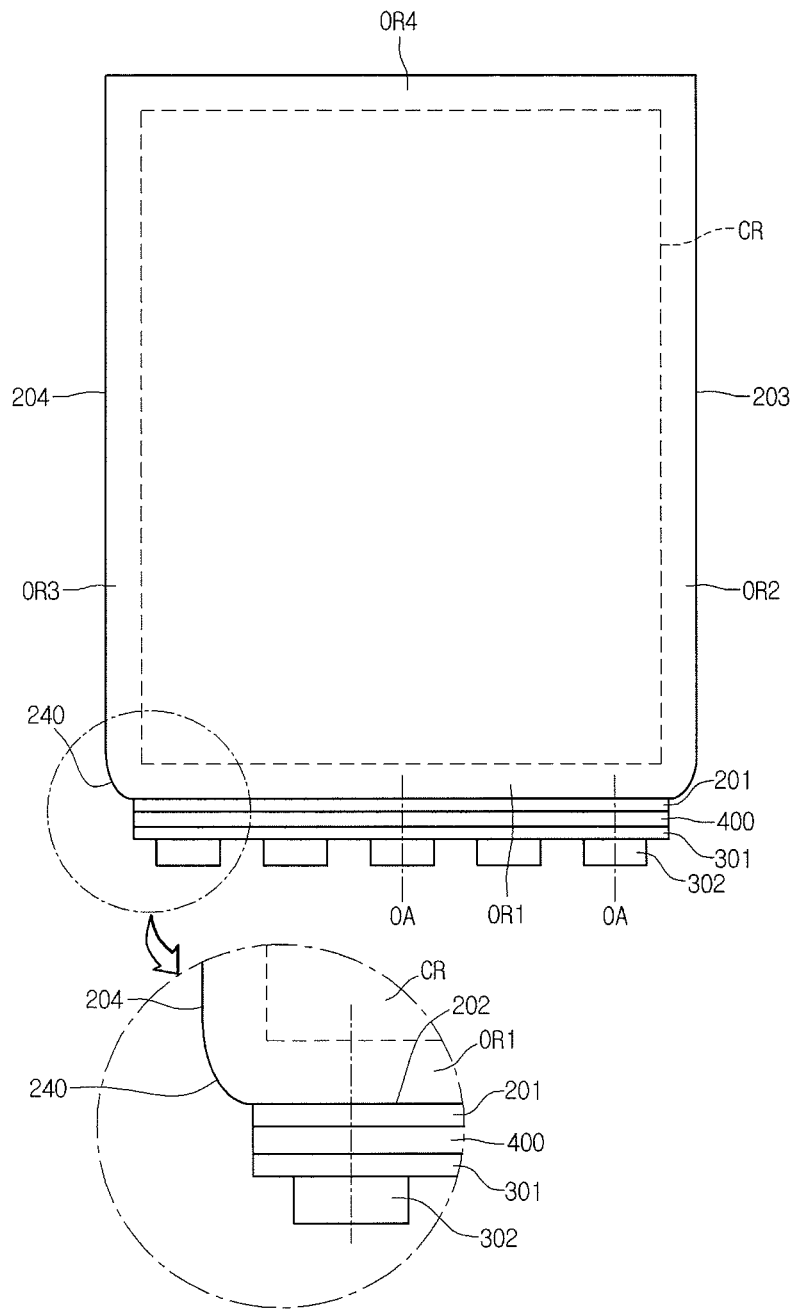
FIG. 8 is a plan view illustrating light emitting diodes, a light conversion member, and a light guide plate according to a fourth embodiment.

FIG. 8 is a plan view illustrating light emitting diodes, a light conversion member, and a light guide plate according to a fourth embodiment. The current embodiment refers to the previous embodiments with respect to a liquid crystal display device, and total reflection surfaces are additionally described. That is, the description of the previous embodiments may be substantially coupled to a description of the current embodiment except for changed parts.

Referring to FIG. 8, total reflection surfaces 240 includes a curved surface. Particularly, the total reflection surfaces 240 may have a curved surface as a whole. The curved surface may extend from a light incident surface 202 of a light guide plate 200 to a first or second side surface 203 or 204 of the light guide plate 200.

Accordingly, the total reflection surfaces 240 can totally reflect light emitted from light emitting diodes 300, more widely.

That is, both light emitted from outermost light emitting diodes 302 and having a great angle from an optical axis OA and light emitted from the outermost light emitting diodes 302 and having a small angle from the optical axis OA may be totally reflected by the curved surfaces. Accordingly, the total reflection surfaces 240 can efficiently and totally reflect the light emitted from the outermost light emitting diodes 302.

Thus, the liquid crystal display device according to the current embodiment can have improved brightness.

Figure 9:
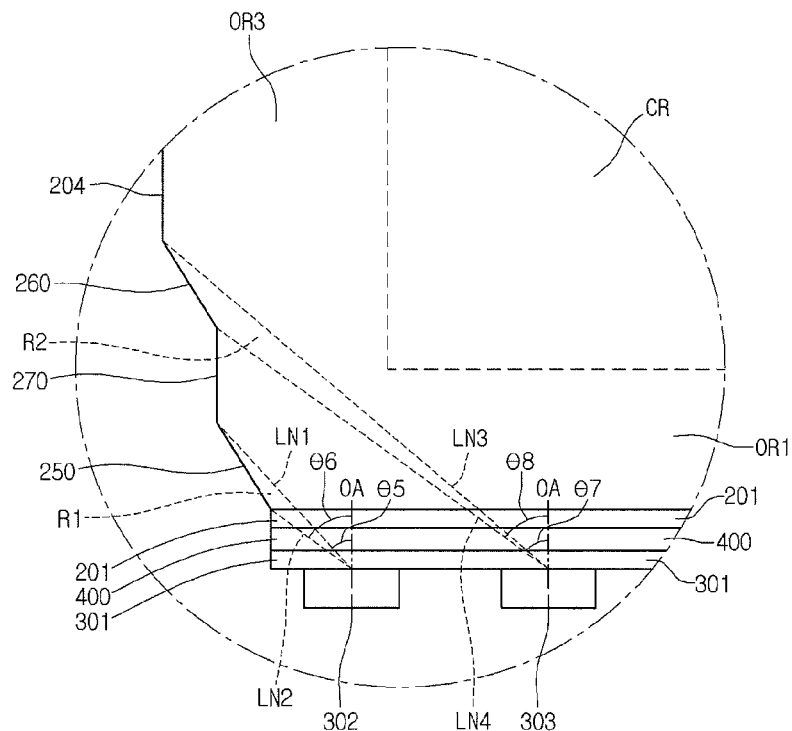
FIG. 9 is a plan view illustrating light emitting diodes, a light conversion member, and a light guide plate according to a fifth embodiment.
Figure 10:
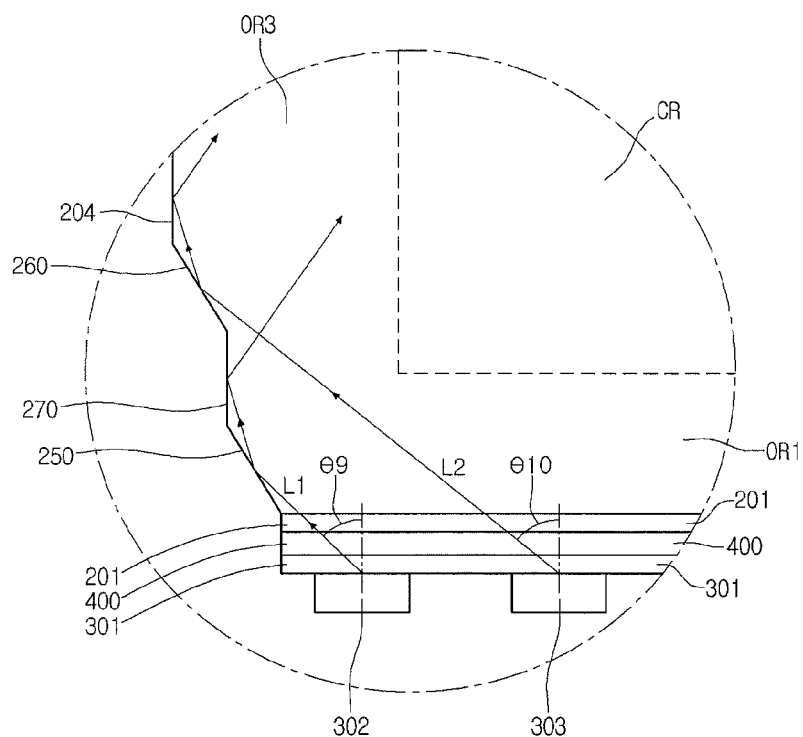
FIG. 10 is a plan view illustrating paths of light emitted from light emitting diodes according to the fifth embodiment.

FIG. 9 is a plan view illustrating light emitting diodes, a light conversion member, and a light guide plate according to a fifth embodiment. FIG. 10 is a plan view illustrating paths of light emitted from light emitting diodes according to the fifth embodiment. The current embodiment refers to the previous embodiments with respect to a liquid crystal display device, and total reflection parts are additionally described. That is, the description of the previous embodiments may be substantially coupled to a description of the current embodiment except for changed parts.

Referring to FIGS. 9 and 10, a light guide plate 200 includes first total reflection surfaces 250, extension surfaces 270, and second total reflection surfaces 260.

The first total reflection surface 250 extends to the extension surface 270 from a light incident surface 202 of the light guide plate 200. The extension surface 270 extends from the first total reflection surface 250 to the second total reflection surface 260. The second total reflection surface 260 extends from the extension surface 270 to a first or second side surface 203 or 204 of the light guide plate 200.

The first total reflection surface 250 may be disposed in a region R1 (hereinafter, referred to as a first region) between a line LN1 extending from outermost light emitting diodes 302 and having an angle θ5 of about 40° from an optical axis OA of the outermost light emitting diodes 302 and a line LN2 extending from the outermost light emitting diodes 302 and having an angle θ6 of about 80° from the optical axis OA. More particularly, the first total reflection surface 250 may be disposed in an overlap between the first region R1 and a second outer region OR2, or an overlap between the first region R1 and a third outer region OR3.

The second total reflection surface 260 may be disposed in a region R2 (hereinafter, referred to as a second region) between a line LN3 extending from second outermost light emitting diodes 303 and having an angle θ7 of about 40° from the optical axis OA of the second outermost light emitting diodes 303 and a line LN4 extending from the second outermost light emitting diodes 303 and having an angle θ8 of about 80° from the optical axis OA. More particularly, the second total reflection surface 260 may be disposed in an overlap between the second region R2 and the second outer region OR2, or an overlap between the second region R2 and the third outer region OR3.

Referring to FIG. 10, the first total reflection surfaces 250 may totally reflect light emitted from the outermost light emitting diodes 302. The first total reflection surface 250 may totally reflect a beam L1 emitted from the outermost light emitting diode 302 and having an angle θ9 from the optical axis OA. For example, the first total reflection surface 250 may totally reflect a beam emitted from the outermost light emitting diode 302 and having an angle of about 40° or greater from the optical axis OA. Particularly, the first total reflection surface 250 may totally reflect a beam emitted from the outermost light emitting diode 302 and having an angle ranging from about 50° to about 80° from the optical axis OA. More particularly, the first total reflection surface 250 may totally reflect a beam emitted from the outermost light emitting diode 302 and having an angle ranging from about 60° to about 70° from the optical axis OA.

Accordingly, the first total reflection surfaces 250 may prevent a portion of light emitted from the outermost light emitting diodes 302 from being laterally emitted through a side surface of the light guide plate 200.

The second total reflection surfaces 260 may totally reflect light emitted from the second outermost light emitting diodes 303. The second total reflection surface 260 may totally reflect a beam L2 emitted from the second outermost light emitting diode 303 and having an angle θ10 from the optical axis OA. For example, the second total reflection surface 260 may totally reflect a beam emitted from the second outermost light emitting diode 303 and having an angle of about 40° or greater from the optical axis OA. Particularly, the second total reflection surface 260 may totally reflect a beam emitted from the second outermost light emitting diode 303 and having an angle ranging from about 50° to about 80° from the optical axis OA. More particularly, the second total reflection surface 260 may totally reflect a beam emitted from the second outermost light emitting diode 303 and having an angle ranging from about 60° to about 70° from the optical axis OA.

Accordingly, the second total reflection surfaces 260 may prevent a portion of light emitted from the second outermost light emitting diodes 303 from being laterally emitted through a side surface of the light guide plate 200.

As such, the first and second total reflection surfaces 250 and 260 may prevent a portion of light emitted from the light emitting diodes 300 from being laterally emitted through a side surface of the light guide plate 200.

Thus, the liquid crystal display device according to the current embodiment can have improved brightness.

Although embodiments have been described with reference to a number of illustrative embodiments thereof, it should be understood that numerous other modifications and embodiments can be devised by those skilled in the art that will fall within the spirit and scope of the principles of this disclosure.

More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A display device comprising:
a light guide plate;

a first light source at a light incident surface of the light guide plate;
a light conversion member between the light guide plate and the first light source; and
a display panel on the light guide plate,
wherein the light guide plate comprises a first total reflection surface totally reflecting light that is emitted from the first light source through the light conversion member, and that has an angle ranging from about 50° to about 80° from an optical axis of the first light source, and
wherein the light conversion member comprises:
a tube;
a sealing member disposed at an end of the tube;
a matrix disposed in the tube;
light conversion particles disposed in the matrix; and
an air layer disposed between the sealing member and the matrix.

2. The display device according to claim 1, wherein the first total reflection surface is disposed at a corner of the light guide plate.

3. The display device according to claim 1, wherein the first total reflection surface extends from a side surface of the light guide plate.

4. The display device according to claim 1, comprising a second light source adjacent to the first light source,
wherein the light guide plate comprises a second total reflection surface totally reflecting light that is emitted from the second light source through the light conversion member, and that has an angle ranging from about 40° to about 80° from an optical axis of the second light source.

5. The display device according to claim 4, wherein the second total reflection surface extends from a side surface of the light guide plate, and
the light guide plate comprises an extension surface extending from the second total reflection surface to the first total reflection surface.

6. The display device according to claim 1, wherein a first line extends from the first light source, and has an angle of about 80° from the optical axis of the first light source,
a second line extends from the first light source, and has an angle of about 40° from the optical axis of the first light source, and
the first total reflection surface is disposed in a region where an outer region of the light guide plate overlaps a region between the first line and the second line.

7. A display device comprising:
a light guide plate;
a light source at a second side surface of the light guide plate;
a light conversion member between the light source and the light guide plate; and
a display panel on the light guide plate,
wherein the light guide plate comprises:
a first side surface crossing the second side surface; and
a total reflection surface extending from the second side surface to the first side surface, and inclined from the second side surface,
wherein the light conversion member comprises:
a tube;
a sealing member disposed at an end of the tube;
a matrix disposed in the tube;
light conversion particles disposed in the matrix; and
an air layer disposed between the sealing member and the matrix, and
wherein the total reflection surface comprises a curved surface.

8. The display device according to claim 7, wherein the total reflection surface is disposed at a corner of the light guide plate.

9. The display device according to claim 7, wherein the light conversion member extends along the second side surface, and
the total reflection surface is disposed at an end of the light conversion member.

10. The display device according to claim 9, wherein the total reflection surface comprises a first total reflection surface and a second total reflection surface, which are disposed at both ends of the light conversion member, respectively.

11. The display device according to claim 7, wherein a portion of light emitted from the light conversion member is totally reflected from the total reflection surface, and
at least one portion of the light totally reflected from the total reflection surface is totally reflected from the second side surface.

12. A display device comprising:
a light source;
a light guide plate to which light is incident from the light source;
a light conversion member between the light source and the light guide plate; and
a display panel on the light guide plate,
wherein the light guide plate comprises:
a central region corresponding to an available display region of the display panel for displaying an image; and
an outer region around the central region,
wherein the light conversion member comprises:
a tube;
a sealing member disposed at an end of the tube;
a matrix disposed in the tube;
light conversion particles disposed in the matrix; and
an air layer disposed between the sealing member and the matrix, and
wherein the total reflection surface comprises a curved surface.

13. The display device according to claim 12, wherein the total reflection surface is disposed at a corner of the light guide plate.

14. The display device according to claim 12, wherein the outer region comprises:
a first outer region adjacent to the light source; and
a second outer region, an extension direction of which crosses an extension direction of the first outer region,
wherein the total reflection surface is disposed in the second outer region.

15. The display device according to claim 12, wherein the outer region comprises:
a first outer region adjacent to the light source; and
a second outer region extending in a direction of which crosses an extension direction of the first outer region,
wherein the total reflection surface is disposed in a portion where the first outer region crosses the second outer region.

16. The display device according to claim 12, wherein the total reflection surface comprises:
a first inclined surface inclined at a first angle from the optical axis of the light source; and
a second inclined surface inclined at a second angle, which is smaller than the first angle, from the optical axis of the light source.

17. The display device according to claim 12, wherein the light guide plate comprises a support part extending in an extension direction of the light conversion member from an end of the total reflection surface.

18. The display device according to claim 12, wherein the light conversion member tightly contacts a light incident surface of the light guide plate.

* * * * *